Jan. 26, 1960 H. M. STEPHENSON 2,922,998

TELEVISION RECEIVER SCREEN

Filed Dec. 6, 1954

Inventor:

Hugh M Stephenson.

United States Patent Office 2,922,998

Patented Jan. 26, 1960

2,922,998

TELEVISION RECEIVER SCREEN

Hugh M. Stephenson, Fort Wayne, Ind.

Application December 6, 1954, Serial No. 473,145

1 Claim. (Cl. 340—369)

My invention relates to a device to be mounted in front of the picture area of a television receiver to improve the picture quality.

Heretofore it has been the practice to superimpose some sort of shaded or tinted semi-translucent sheet over the illuminated picture area, or to treat or spray the front surface of the picture tube with some translucent material, to reduce the glare and unpleasant contrasts of black and white cathode tube luminescence. These practices have resulted in a certain amount of deterioration of the picture delineation.

It is, therefore, most desirable to provide structure to eliminate, as much as possible, such glare and contrast without, however, sacrificing detail and illumination. Another feature which reduces the viewer's enjoyment is the inherent flickering of the horizontal lines of the picture interlace. When these lines are broken up into small elements, the flickering becomes unnoticeable and it is, therefore, desirable that any structure provided should also perform this function. In addition, the viewer receives a pleasing impression from a certain amount of color shading of the black and white picture produced by a single electron emitter monochrome picture tube, and it is desirable that the structure provide such shading. Yet another desirable, yet heretofore unobtainable feature is a stereoscopic illusion of depth.

The principal object of my invention is, therefore, to provide a structure which will improve the picture from a television receiver as set forth above.

Other objects of my invention will become clear from the detailed description set forth below.

Figure 1:
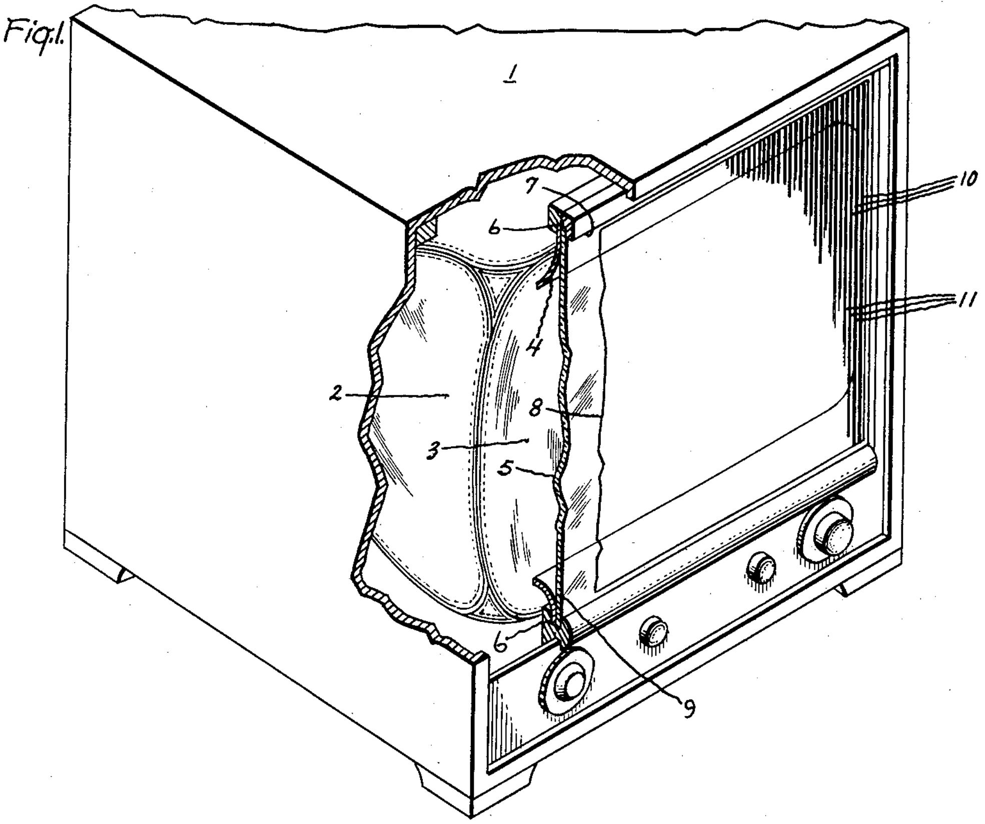
Figure 2:
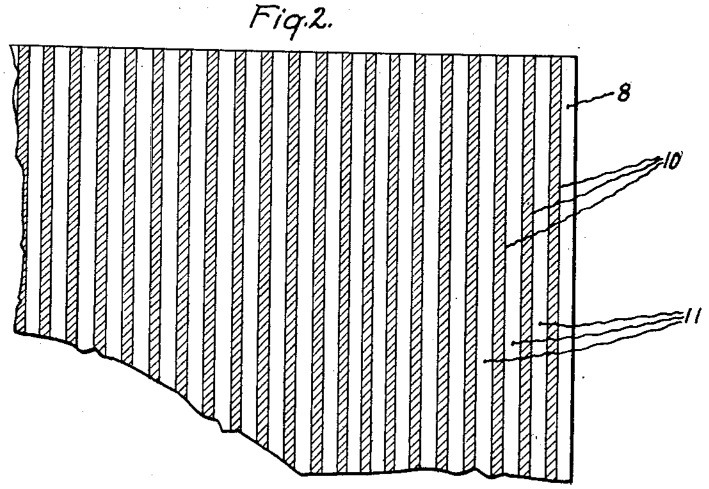

In the drawing, Figure 1 is a sectional view in perspective of a television receiver provided with my improved screen; and Figure 2 is a fragmentary front view of my improved screen.

Referring now to the drawing, the figures show a television receiver cabinet 1 having a picture tube 2, with a picture area 3. Area 3 may be encompassed by a mask 4 and is protected by a safety glass shield 5. The shield and the mask may be maintained in place by any desired means; for instance, they may rest in a rabbet 6 extending around the cabinet opening 7. The above structure is set forth for illustrative purposes, and it will, of course, be understood that it may be varied in a multitude of ways without impairing the utility of my invention as set forth below. A sheet 8 of transparent material is arranged in front of the picture area 3. Sheet 8 may be composed of any suitable material, such as, for instance, cellulose acetate or polyethylene terephthalate. The sheet may be secured in any desired way; as shown, for instance, it may be attached to the front surface 9 of the glass shield 5 by adhesive at the edges. It will, however, be understood from the following description that the important point is that sheet 8 be arranged substantially in a single plane in front of area 3, and that this may be effected in different ways without affecting the present invention. Sheet 8 is provided with a series of uniformly spaced parallel lines 10 separated by spaces 11, and is so arranged relative to picture area 3 that lines 10 are substantially perpendicular to the pattern of the horizontal interlace raster of the illuminated picture presentation.

The width of the lines 10 and the spacing between the lines are porportioned to obtain the optimum balance of illumination through the transparent spaces and the lines, with a consequent reduction of glare without loss of picture delineation. The optimum ratio of line width to spacing has been found to be in the range of approximately 1–4 to 1–1 for opaque lines and approximately 1–1.7 to 1–1 for translucent lines, the precise optimum ratios varying somewhat with the dimensions of the horizontal raster pattern. While the width of the lines 10 may be varied, a width of 1/64 inch with a 1–1 width ratio for translucent colored lines has been found to give superlative results.

It has been discovered that the structure set forth above provides an illusion of depth heretofore unobtainable when the sheet 8 is spaced from the picture area 3. This spacing may be achieved, for instance, by securing sheet 8 to safety glass 5 as set forth above. The illusion of depth is due to the slightly different picture presentation for each eye (binocular vision) combined with the placement of the substantially vertical parallel lines in front of, and spaced apart from, the plane of the picture presentation. This combination of circumstances tends to produce a stereoscopic effect without necessitating additional optical equipment.

When lines 10 are opaque, the preferable color of the lines lies in a red-brown combination which lends a soft sepia tone to the otherwise unlifelike black and white picture presentation. The sepia tone results from back reflection from the lines to the spherical surface of the picture tube which diffuses the color and reflects it again toward and through the spaces 11.

When translucent colored lines are used, the preferable color has been found to lie in the poster red (70% red and 30% yellow) or in the magenta color spectrum. These colors, coupled with the illumination from the picture tube 3 shining through the lines 10, result in natural flesh tints for persons shown in the picture presentation. This effect has been found to be enhanced by lines shaded toward transparency from the center of each line to the edges thereof. This shading produces an apparent out-of-focus effect of the parallel lines 10 which makes them almost invisible to the television viewer, even at extremely close range.

In addition, it will be observed that the vertical lines 10 of the sheet 8 will effectively break up the flickering horizontal lines of the picture interlace thereby making the flickering practically unnoticeable to a viewer.

While I have described specific embodiments of my invention, it is clear that my invention is not limited to the specific arrangements disclosed, and I intend in the appended claim to cover all embodiments which do not depart from the spirit and scope of my invention.

What I claim as new and desire to secure by Letters Patent of the United States is:

In combination with a television receiver including a picture tube having a picture area, a sheet of transparent material having thereon only a series of substantially uniformly spaced substantially parallel lines positioned in front of and spaced from said picture area, said lines being colored and translucent and shaded toward transparency from their centers to their edges, the ratio of the width of each said line and the width of each space between lines being approximately between 1–1.7 and1–1, said sheet being positioned so that said lines are substantially vertical to the horizontal sweep raster of the picture presentation from said picture tube.

References Cited in the file of this patent

UNITED STATES PATENTS

| | | |
|---|---|---|
| 2,053,173 | Astima | Sept. 1, 1936 |
| 2,487,817 | Lubin | Nov. 15, 1949 |
| 2,545,348 | Fabel | Mar. 13, 1951 |
| 2,548,967 | Givaudan | Apr. 17, 1951 |
| 2,657,133 | Weingarten | Oct. 27, 1953 |
| 2,674,649 | Wetzel | Apr. 6, 1954 |

FOREIGN PATENTS

| | | |
|---|---|---|
| 675,925 | Great Britain | July 16, 1952 |